United States Patent
Azar et al.

(10) Patent No.: US 12,305,618 B2
(45) Date of Patent: May 20, 2025

(54) METHOD FOR COMPUTER-IMPLEMENTED DETERMINATION OF CONTROL PARAMETERS FOR A TURBINE

(71) Applicant: Siemens Gamesa Renewable Energy A/S, Brande (DK)

(72) Inventors: Ziad Azar, South Yorkshire (GB); Richard Clark, Sheffield (GB); Alexander Duke, Sheffield (GB); Arwyn Thomas, Breaston (GB); Zhan-Yuan Wu, Sheffield (GB)

(73) Assignee: Siemens Gamesa Renewable Energy A/S, Brande (DK)

( * ) Notice: Subject to any disclaimer, the term of this patent is extended or adjusted under 35 U.S.C. 154(b) by 605 days.

(21) Appl. No.: 17/633,459

(22) PCT Filed: Jul. 30, 2020

(86) PCT No.: PCT/EP2020/071511
§ 371 (c)(1),
(2) Date: Feb. 7, 2022

(87) PCT Pub. No.: WO2021/028232
PCT Pub. Date: Feb. 18, 2021

(65) Prior Publication Data
US 2022/0282703 A1   Sep. 8, 2022

(30) Foreign Application Priority Data
Aug. 14, 2019  (EP) ..................................... 19191786

(51) Int. Cl.
*F03D 7/04* (2006.01)
*F03D 9/25* (2016.01)

(52) U.S. Cl.
CPC .............. *F03D 7/045* (2013.01); *F03D 9/25* (2016.05); *F05B 2220/706* (2013.01); *F05B 2260/84* (2013.01); *F05B 2270/335* (2013.01)

(58) Field of Classification Search
CPC .......... F03D 7/045; F03D 9/25; F03D 7/0288; F05B 2220/706; F05B 2260/84; F05B 2270/335; F05B 2270/303
See application file for complete search history.

(56) References Cited

U.S. PATENT DOCUMENTS

| 10,731,628 | B1* | 8/2020 | Gadiraju | ................... H02J 3/50 |
| 2004/0178639 | A1 | 9/2004 | Wobben | |

(Continued)

FOREIGN PATENT DOCUMENTS

| CN | 1795332 A | 6/2006 |
| CN | 101371037 A | 2/2009 |

(Continued)

OTHER PUBLICATIONS

PCT International Search Report & Written Opinion mailed Oct. 16, 2020 corresponding to PCT International Application No. PCT/EP2020/071511.

*Primary Examiner* — Charles Cai
(74) *Attorney, Agent, or Firm* — Schmeiser, Olsen & Watts, LLP

(57) ABSTRACT

A method for computer-implemented determination of control parameters of a turbine in case of a component malfunction is provided. The method considers the impact of individual turbine characteristic values on the turbine performance in a turbine model in order to determine control parameters for the turbine without damaging it. The following includes the steps of: receiving, by an interface, an information indicating a component malfunction; identifying, by a processing unit, as to what power level the turbine is operated at, by a simulation of the operation of the turbine, (Continued)

the simulation being made with a given turbine model in which the identified component is set to be operated with a reduced function and in which one or more characteristic values characteristic values of the wind turbine are used as input parameter; and deriving, by the processing unit, the control parameters for the wind turbine from the identified power level.

14 Claims, 3 Drawing Sheets

(56) References Cited

U.S. PATENT DOCUMENTS

| | | | | |
|---|---|---|---|---|
| 2008/0086281 | A1* | 4/2008 | Santos | F03D 7/0292 700/32 |
| 2009/0243301 | A1* | 10/2009 | Longtin | H02K 7/1838 290/55 |
| 2012/0150524 | A1 | 6/2012 | Nielsen | |
| 2014/0344209 | A1* | 11/2014 | Fang | G06N 7/01 706/52 |
| 2017/0002796 | A1 | 1/2017 | Spruce et al. | |
| 2019/0113023 | A1* | 4/2019 | Day | F03D 9/25 |
| 2019/0203695 | A1* | 7/2019 | Hammerum | F03D 7/0264 |
| 2019/0368465 | A1* | 12/2019 | Mandrioli | F03D 7/0224 |
| 2020/0044598 | A1* | 2/2020 | Lima | H02J 7/35 |

FOREIGN PATENT DOCUMENTS

| | | |
|---|---|---|
| CN | 102444545 A | 5/2012 |
| CN | 102620937 A | 8/2012 |
| CN | 104995813 A | 10/2015 |
| EP | 2531723 A2 | 12/2012 |
| EP | 2609326 A2 | 7/2013 |
| EP | 3180514 A1 | 6/2017 |
| WO | 8300195 A1 | 1/1983 |

* cited by examiner

METHOD FOR COMPUTER-IMPLEMENTED DETERMINATION OF CONTROL PARAMETERS FOR A TURBINE

CROSS-REFERENCE TO RELATED APPLICATIONS

This application claims priority to PCT Application No. PCT/EP2020/071511, having a filing date of Jul. 30, 2020, which claims priority to EP Application No. 19191786.3, having a filing date of Aug. 14, 2019, the entire contents both of which are hereby incorporated by reference.

FIELD OF TECHNOLOGY

The following relates to a method and a system for computer-implemented determination of control parameters of a turbine in case of a component malfunction. In particular, the following relates to a method and a system for computer-implemented determination of control parameters of a single wind turbine or a wind turbine of a wind park having a generator or a gas turbine having a generator.

BACKGROUND

The operation of wind turbines is based on nominal characteristic values of the wind turbine which characterize the wind turbines in terms of power output in dependency of wind speed. Using nominal parameters enables the manufacturer of the wind turbine to guarantee specific annual energy production (AEP) to customers as the wind turbines are treated as having identical performance at its contractual rated point. The nominal parameters therefore are used as a basis to derive turbine control parameters (short: control parameter) with regard to a specific power output at a specific ambient condition, in particular wind speed.

When an issue occurs in the wind turbine resulting in a malfunction of a component, e.g., one of the cooling fans stops functioning, usually the wind turbine is shut down. As a consequence, the power output equals to zero. Due to environmental conditions, particularly off-shore, it can take a long time to fix a turbine, possibly up to a number of days/weeks/months. Hence, the shut-down results in a large AEP loss.

The same problems arise in other industrial processes, such as the operation of gas turbines.

SUMMARY

An aspect relates to provide a computer-implemented method and a system which reduces AEP loss as much as possible in case of a component malfunction of a turbine. An aspect further relates to provide a computer program product (non-transitory computer readable storage medium having instructions, which when executed by a processor, perform actions).

According to a first aspect of embodiments of the present invention, a method for computer-implemented determination of control parameters of a turbine with a component malfunction is suggested. The turbine may be a single wind turbine. The turbine may be a wind turbine of a wind park. In case the turbine is a wind turbine it comprises a generator. Alternatively, the turbine may be a gas turbine having a generator.

The method comprises the step of receiving, by an interface, an information indicating a component malfunction. The information does not only contain a flag that a malfunction has occurred but also an information element which component of the turbine has the malfunction and/or an information element about the degree of the malfunction, e.g., a partial or total failure of the component and/or a temporal or permanent failure of the component.

The method comprises as a further step, identifying, by a processing unit, as to what power level the turbine can be operated at, by a simulation of the operation of the turbine. The simulation is made with a given turbine model in which the identified component is set to be operated with a reduced function. Setting the identified component having the malfunction within the simulation to an operation with reduced function comprises cases in which the function is only partially (e.g., 90%, 70%, 50%, 20% of a nominal functionality and so on) as well as cases in which the identified component is out of order. In addition, one or more characteristic values of the turbine are used as input parameter in the turbine model.

The method comprises as a last step, deriving, by the processing unit, the control parameters for the turbine from the identified power level.

The method is based on the consideration that a turbine having a faulty component can be operated at reduced power. By identifying the power level to which the turbine can be run despite a faulty component, a revised operating point can be estimated by means of the given turbine model to produce as much power as possible without damaging the turbine due to a (thermal, electrical or mechanical) overload which would reduce the turbines overall lifetime.

Considering suitable characteristic values for the turbine enables forming a tailored turbine "DNA" which can be regarded as a unique map of characterizing turbine parameters. Having knowledge about manufacturing tolerances of the turbine, a given turbine model can be fed with the characteristic values and the information indicating a component malfunction to determine whether the turbine is able to still produce power without damage or degradation of its lifetime characteristics. The determination whether or not a faulty turbine is able to be controlled such that, in case of a wind turbine, power is generated can be derived from an associated power versus wind speed map which can be derived from the output of the given turbine model which processes the one or more characteristic values of the wind turbine as input parameters in addition to the information about the faulty component.

Hence, the characteristic values and the information indicating a component malfunction are considered in a turbine model to derive actual and turbine specific control parameters in case of a faulty turbine. This mechanism on power maximization by using the given turbine model does not have negative impact to the existing turbine structure, such as generator, power converter and blades, etc. as their operation is considering nominal and/or actual characteristic values and functionality of turbine components.

According to an embodiment, the turbine model is a physical model which is based on a number of equations found by simulations and/or validated test data and/or look-up tables. The turbine model may, in addition, consider a number of measured performance parameters, such as temperatures, current load profile, etc. to determine, in case of a wind turbine, the power versus wind speed map for a specific wind turbine.

The one or more characteristic values may be retrieved and received, by the interface, from a database. The interface and the processing unit are part of a computer system. The computer system may be part of a controlling instance of the wind turbine. Alternatively, the computer system may be part of an external controlling system. The database may be stored on that computer system or may be an external database connected to the computer system. The one or more characteristic values consist of nominal parameters of the characteristic values (i.e. nominal characteristic values) and/or manufacturing tolerances of the characteristic values (i.e. actual characteristic values) obtained by measurement during the manufacturing process and collated, for a plurality of turbines, in the database.

The one or more characteristic values include one or more of: an airgap (between a rotor and a stator), a magnet performance, a magnet dimension, a thermal conductivity and a coil resistance. In addition to the characteristic values, further characteristic values may be considered as well, such as variations of coil and so on.

According to a further embodiment, in case of a wind turbine, identifying the power level corresponds to determining a power versus wind speed map which is calculated from the given turbine model and the information indicating a component malfunction. Having knowledge about manufacturing tolerances of the wind turbine, a given turbine model can use manufacturing tolerances as input to determine whether the wind turbine is able to produce more power compared to only considering nominal parameters. The determination whether or not the turbine is able to be controlled with improved control parameters to calculate its maximum power output at a given wind speed can be derived from the associated power versus wind speed map which is derived from the output of the given turbine model which processes the one or more manufacturing tolerances of the respective wind turbines and the information indicating a component malfunction as input parameters.

As a further embodiment, in case of a wind park, the method comprises as a step, deriving the control parameters for a plurality of wind turbines of the wind park from the information of component malfunction and the identified turbine power level. The increased power level for proximity wind turbines of the turbine having a malfunction can be used to fill any unused capacity in the grid connection.

According to a further embodiment, as further input parameters of the turbine model historical turbine sensor data and/or historical operating conditions are processed for determining, by the processing unit, for the wind turbine, the power versus wind speed map. Considering historical sensor data captured by physical and/or virtual sensors enables to receive information about the behavior of components with respect to lifetime considerations. Historical sensor data to be considered may consist of component temperatures, ambient temperatures, wind speed, among others. The historical data may be compared with real-time sensor data during the past operation of the wind turbine. A comparison of measured lifetime data with those resulting from the turbine model allows for a flexible exploitation of generous manufacturing margins to still have maximum/optimum AEP in case of a malfunction.

According to a further embodiment, the turbine model considers a drive train consisting of a rotor hub, a generator and a converter, of the wind turbine. In case of a gas turbine, the turbine model considers a drive train consisting of a rotor hub, a generator and a converter. In addition, or alternatively, the turbine model may consider blades and/or gearbox and/or nacelle and/or tower and/or cable and/or a transformer of the wind turbine.

According to a further embodiment, for identifying as to what power level the turbine can be operated the thermal performance of the turbine is modelled by the given turbine model. This will provide new reference power requirements whilst remaining within limitations of the turbine and whilst accounting for any specific characteristics of that turbine.

According to a second aspect of embodiments of the present invention, a computer program product directly loadable into the internal memory of a digital computer is suggested, comprising software code portions for performing the steps of the method described herein when said product is run on a computer. The computer program product may be in the form of a storage medium, such as a CD-ROM, DVD, USB-stick or a memory card. The computer program product may also be in the form of a signal which is transferable via a wired or wireless communication line.

According to a third aspect, a system for computer-implemented determination of control parameters of a turbine is suggested. The turbine may be a single wind turbine or a wind turbine of a wind park having a generator or a gas turbine having a generator. The system comprises an interface which is adapted to receive an information indicating a component malfunction, and a processing unit which is adapted to determine as to what power level the turbine can be operated at, by a simulation of the operation of the turbine, the simulation being made with a given turbine model in which the identified component is set to be operated with a reduced function (i.e. down or partially down) and in which one or more characteristic values of the turbine are used as input parameter, and to derive the control parameters for the turbine from the identified power level.

BRIEF DESCRIPTION

Some of the embodiments will be described in detail, with reference to the following figures, wherein like designations denote like members, wherein.

DETAILED DESCRIPTION

In the following section, an example of embodiments of the invention will be described by referring to a wind turbine. As will be understood by the skilled person, the method can be used in other industrial applications as well, in particular in the field of gas turbines.

At present, when an issue occurs in a wind turbine resulting in a malfunction of a component, a decision has to be made whether to shut down the wind turbine or to operate it with reduced power output until the issue is fixed. Such an issue could be, for example, one of a plurality of cooling fans stops functioning. If the wind turbine is shut down due to the malfunction, further damage can be avoided. However, as a consequence, the power output equals to zero. Due to environmental conditions, particularly off-shore, it can take long time to fix a turbine, possibly up to a number of days/weeks/months. An operation with reduced power often is taken into consideration, with the risk of damaging further components of the wind turbine. To avoid damaging the wind turbine, the control parameters of the turbine are chosen such that the power output is very low, resulting in a significant AEP loss compared to a normal operation.

The below described method enables a computer system to find a trade-off between minimizing the risk of damaging the wind turbine due to an operation with reduced power despite a component malfunction and maximizing AEP.

Figure 1:
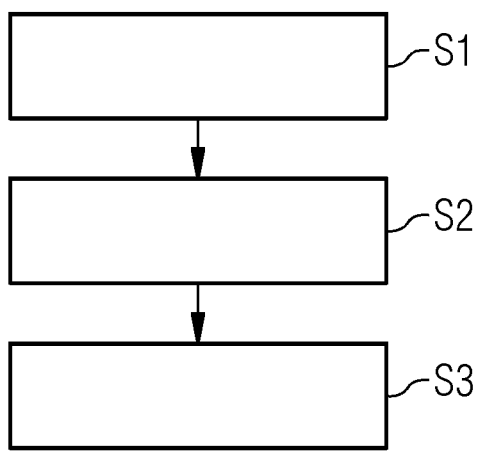
FIG. 1 shows a flow chart illustrating the steps of the method according to the present invention.
Figure 2:
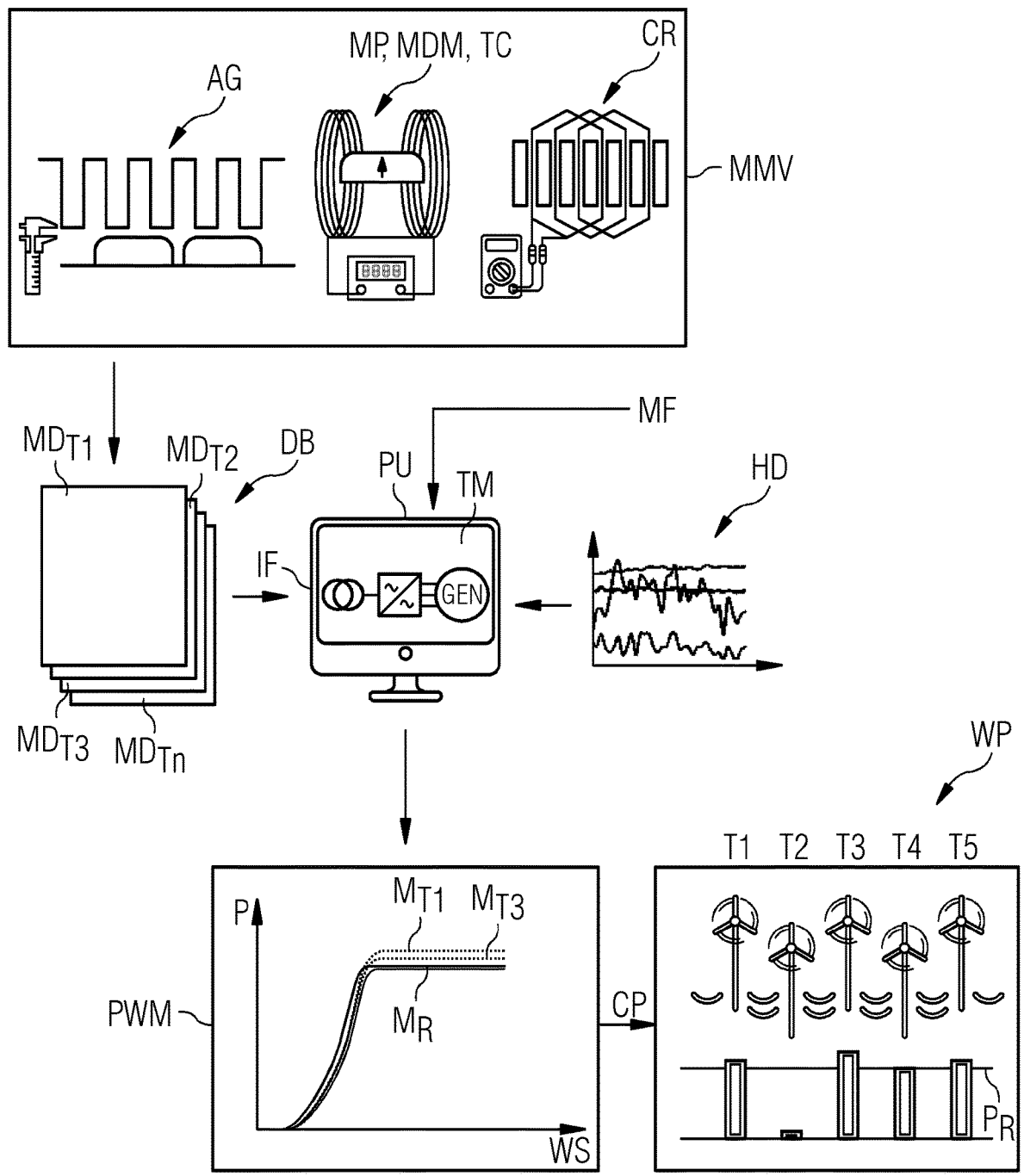
FIG. 2 shows a schematic diagram illustrating the steps for carrying out the method for determination of improved control parameters of a number of wind turbines of a wind park.

Referring to FIG. 1, in step S1 an information ML indicating a component malfunction is received by an interface IF of a processing unit PU (FIG. 2). The information ML does not only contain a flag that a malfunction has occurred but also an information element which component of the wind turbine has the malfunction and/or an information element about the degree of the malfunction, a partial or total failure of the component and/or a temporal or permanent failure of the component. For example, one of the cooling fans stops functioning.

In step S2, the processing unit PU identifies, as to what power level the wind turbine can be operated at, by a simulation of the operation of the wind turbine. The simulation is made with a given turbine model in which the identified component is set to be operated with a reduced function (i.e. in the chosen example, one of the cooling fans is out of order). In addition, one or more manufacturing tolerances of characteristic values AG, MP, MDM, TC, CR for the wind turbine are used as input parameter.

In step S3, control parameters CP for the wind turbine are derived from the identified power level by the processing unit PU.

The method is based on the consideration that a wind turbine having a faulty component can be operated at reduced power. By identifying the power level to which the wind turbine can be run despite a faulty component, a revised operating point can be estimated by means of the given turbine model to produce as much power as possible without damaging the wind turbine due to a (thermal, electrical, mechanical) overload which reduces the turbines overall lifetime.

The method can also consider the impact of individual turbine manufacturing tolerances on the turbine performance, thereby avoiding under-utilization of a faulty wind turbine, in other words maximize the output power of faulty turbines based on it manufactured parameter and dimensions. Due to the consideration of individual turbine manufacturing tolerances, at least some of them are able to be operated in an optimized manner resulting in an increasing AEP of the wind turbine. However, it is to be understood that the turbine model can be fed with nominal characteristic values as well. In a further implementation, both nominal characteristic values and actual characteristic values considering the manufacturing tolerances may be used as input information in the turbine model.

Referring to FIG. 2, in a first or preparing step, measurement of manufacturing data MMV is executed. Manufacturing tolerances having an impact on the turbine performance are, for example, an airgap AG, a magnet performance MP (as a result of the magnet material and/or dimensions MDM and/or manufacturing processes), thermal conductivity TC, and coil resistance CR. Each of these manufacturing tolerances are actual characteristic values which are individual for each turbine to be considered. The manufacturing tolerances of these characteristic values AG, MP, MDM, TC, CR do have an immediate impact on the turbine performance, both in normal operation without any issues and during operation when an issue has occurred.

The manufacturing tolerances, typically different for every turbine (turbine DNA), of the characteristic values AG, MP, MDM, TC, CR are collated and stored in a database DB. For each turbine T1, . . . , Tn (where n corresponds to the number of wind turbines in a wind park WP), a manufacturing dataset $MD_{T1}, \ldots, MD_{Tn}$ may be stored containing the characteristic values AG, MP, MDM, TC, CR. The manufacturing dataset $MD_{T1}, \ldots, MD_{Tn}$ may be regarded as DNA of each individual wind turbine T1, . . . , Tn. It is to be understood that storing of manufacturing data consisting of the manufacturing tolerances of characteristic values AG, MP, MDM, TC, CR may be made in any way, such as a lookup-table, associated maps, etc.

The manufacturing tolerances of the characteristic values AG, MP, MDM, TC, CR are received at the interface IF of a computer or computer system. The computer or computer system comprises the processing unit PU. The database DB may be stored in a memory of the computer (system) or an external storage of the computer (system). The database DB may be cloud based in another implementation. The processing unit PU is adapted to determine, for each of the number of wind turbines T1, . . . , Tn, a power versus wind speed map $M_{T1}, \ldots, M_{Tn}$. The power versus wind speed map $M_{T1}, \ldots, M_{Tn}$ is calculated from the above mentioned given turbine model TM with the actual characteristic values AG, MP, MDM, TC, CR considering manufacturing tolerances of the respective wind turbines T1, . . . , Tn and/or actual characteristic values AG, MP, MDM, TC, CR and a component malfunction MF, if any, as input parameters.

For each type of wind turbine, a specific turbine model may be provided. In an alternative embodiment, a specific turbine model may be used for a respective wind turbine of the wind park. In a further alternative embodiment, a common turbine model may be used for all wind turbines of the wind park.

The turbine model is a physical model which is based on a number of equations found by simulations and/or validated test data. The turbine model can be regarded as a "digital twin" for each individual wind turbine. The power versus wind speed maps $M_{T1}, \ldots, M_{Tn}$ of each individual wind turbine T1, . . . , Tn are unique maps resulting from the turbine model and the nominal and/or characteristic values AG, MP, MDM, TC, CR. They are created for the turbines having no malfunctions. In addition, additional maps for each turbine are created for all possible malfunctions. These maps may be created in advance, i.e. before a respective issue is determined. Alternatively, these maps may be created upon receiving the information ML indicating a component malfunction.

Figure 3:
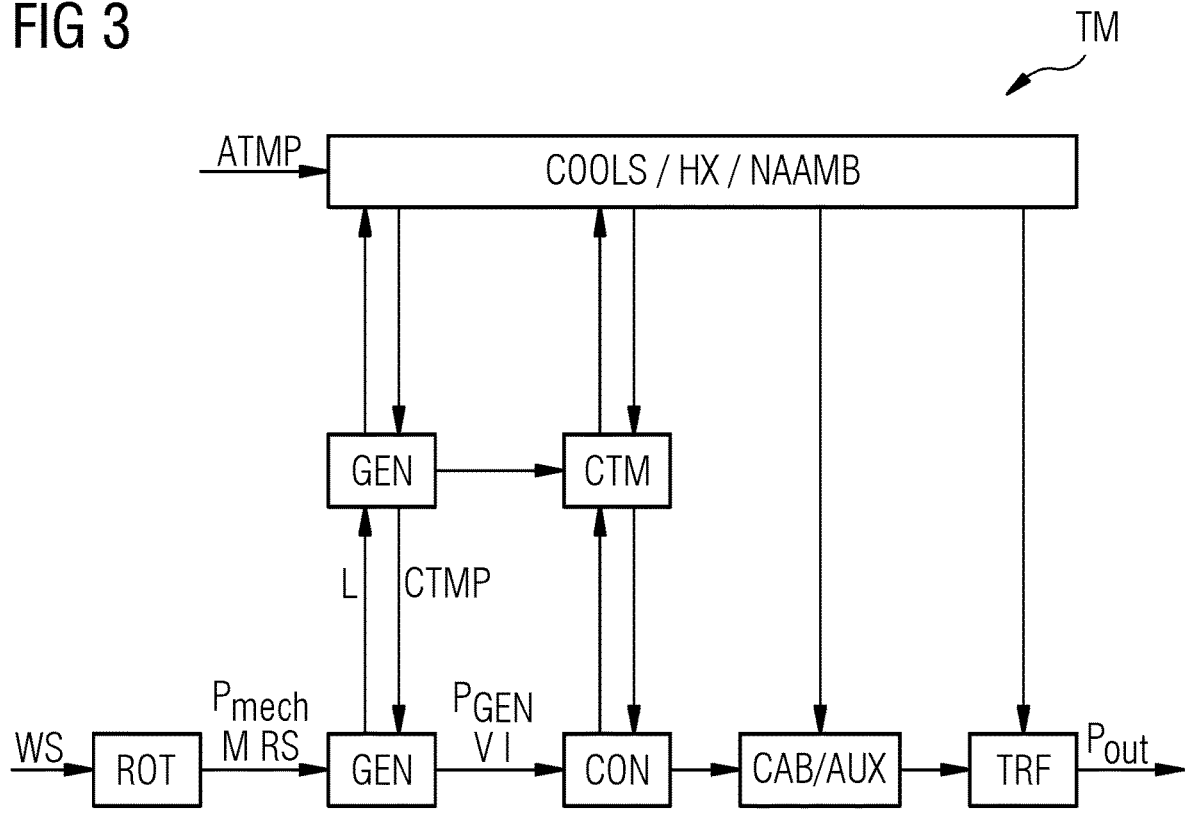
FIG. 3 illustrates a schematic diagram illustrating a turbine model which is used to determine improved control parameters of a wind turbine.

FIG. 3 illustrates an embodiment of the turbine model used to model an individual wind turbine. In this embodiment, the turbine model TM considers a drive train of the wind turbines consisting of a rotor hub ROT, a generator GEN, a converter CON, cables CAB and auxiliary/ancillary components AUX, and a transformer TRF. However, the turbine model can also consider components of the wind turbine, such as blades, nacelle, tower, sub-stations, gearbox (for geared-drive turbine) and so on.

The turbine model TM calculates the losses of components within the drive train to account for the loss in power/energy between the turbine blade input and the output to grid during the electromechanical energy conversion and ancillary or supporting systems. As the loss mechanisms are temperature dependent and themselves generate heat, the turbine model TM is coupled or includes a thermal model for the generator GEN (generator thermal model GTM) and/or a thermal model for the converter CON (converter thermal model CTM) and is solved iteratively. The generator thermal model GTM and the converter thermal model CTM are coupled to components affecting the cooling of the drive train, such as cooling system COOLS (e.g., cooling fans), heat exchanger HX, and nacelle ambient NAAMB.

The turbine model TM calculates the available power $P_{out}$ at the (grid) output based on the input ambient conditions of wind speed WS and temperature ATMP. The turbine model TM can be used to assess the potential AEP for a given wind turbine and site by inputting historical and/or predicted wind conditions over a given period of time. The use of the thermal models GTM, CTM allows for any control features such as high temperature curtailment to be accounted for accurately. Alternatively, the turbine model TM can be employed in real time to assess the potential output and/or impact of control decisions on a specific generator operating point. Furthermore, it may be used as reference against the actual turbine comparing actual and predicted operation in response to the operating conditions to act as a health monitor.

The turbine model TM can be implemented in a number of different environments/programming codes. Typically, it may be based on iterative solver routines to handle both thermal coupling and control algorithms. Where possible, reduced order models, look-up tables or functions (equations) are used to represent complex behaviors using suitable approximations and/or assumptions to ensure short computation times whilst maintaining a suitable level of accuracy.

The turbine model TM, as shown in FIG. 3, may be extended to include blade models or structural models of the turbine. Such a model can be used to represent any electrical drive/generator system beyond the wind turbine.

More detailed the turbine model TM includes the following sub-models:

A rotor model for modelling the rotor ROT by converting wind speed WS into a rotor/blade rotational speed RS and mechanical power $P_{mech}$ (i.e. input torque M).

An optional bearing model for modelling the bearing by accounting for non-ideal main bearings and hence power loss.

A generator model for modelling the generator GEN by considering the main mechanical to electrical energy conversion accounting for the torque capability, voltage production and losses incurred in conversion. This may be implemented by a numerical computation of the electromagnetic performance (e.g., Finite Element Analysis), an analytical model, or a hybrid of these which uses a Reduced Order Model (ROM) in which the generator performance is derived through a-priori numerical modelling and distilled into simpler functions or look-up tables. The generator model is also adapted to calculate losses incurred in the conversion such as winding copper losses and stator electrical steel iron losses. It accounts for control decisions.

A converter model for modelling the converter CON: For example, in a direct dive permanent magnet generator the variable frequency output of the generator is interfaced with the fixed frequency grid via a power electronic converter (active rectifier—DC link—inverter) which allows for control of the generator operating conditions. The load dependent switching and conduction losses in the converter are accounted for.

A cable loss model for modelling the cables CAB by consideration of Ohmic losses in connections cables.

An auxiliary/ancillary loss model for modelling auxiliary/ancillary components AUX by accounting for power consumed by supporting services such as cooling fans, pumps and hydraulic control systems as these losses detract from the available power at the grid.

A transformer loss model for modelling the transformer TRF by accounting for Ohmic winding losses and core losses which are dependent on load conditions.

Thermal models of the generator GEN and the converter CON: The performance and losses of the above components are temperature dependent. For example, the resistance and hence copper losses produced by the stator electrical windings increase due to the copper resistivity dependence on temperature and the flux produced by a permanent magnet (the field source in the generator) varies due to changes in the material remanence with temperature. As the losses themselves increase component temperature the above loss models are calculated iteratively with the respective thermal model GTM. CTM. As with the generator model, this may be implemented by a Reduced Order model using parameters derived from numerical modelling e.g., CFD and Thermal FEA to create an equivalent circuit or lumped parameter network.

A number of maps $M_R$, $M_{T1}$ and $M_{T3}$ resulting from the turbine model TM is illustrated in the P-WS-diagram (power versus wind speed map PWM). In this diagram, a map $M_R$ of a wind turbine which is calculated based on nominal parameters and two maps $M_{T1}$ and $M_{T3}$ for turbines T1, T3 are illustrated. By way of example only, the maps $M_{T1}$ and $M_{T3}$ of the turbines T1, T3 show that (at least some of) the manufacturing tolerances of the characteristic values AG, MP, MDM, TC, CR are more advantageous than that of the nominal turbine resulting in an additional power P for a given speed WS.

Based on their associated power versus wind speed maps control parameters CP can be derived for each individual turbine (either with or without a malfunction) which are used for controlling the wind turbines. In the illustration of FIG. 2, the wind park consists of five turbines T1, . . . , T5. However, it is to be understood, that the number of wind turbines may be arbitrary. The number of wind turbines may be one (1), i.e., the wind park corresponds to a single wind turbine. If the number of wind turbines is greater than one, the wind turbines are arranged in proximity to each other, to supply the total produced power at a single point to an energy grid.

The actual power output P1, . . . , P5 in relation to a rated output PR of a turbine with nominal characteristic values is indicated below the turbines T1, . . . , T5. As can easily be seen, turbines T1, T3 and T5 generate a power output P1, P3, P5 which is above the rated output of a turbine with nominal characteristic values. Turbine T2 which has a malfunction produces a power which is significant below the rated output. Power output P4 of wind turbine T4 corresponds to the rated output of a turbine with nominal characteristic values.

By using a turbine-specific model and evaluating a particular issue, the decision can be made as to what power level the turbine can be safely operated at. Thus, power can still be produced from the turbine with a component issue within safety limits found in the turbine model. For example, if at turbine T2 one of the cooling fans has stopped working, the thermal performance of the turbine model for that particular turbine T2 can be modelled with one less fan. This will provide the new reference power requirements whilst remaining within the generator limitations and whilst also accounting for any specific characteristics of that turbine.

If the turbine T2 would be operated at reduced power, however, without the above evaluation, the revised operating point could be underestimated losing AEP or overestimated leading to extra faults, thermal overload (reducing the turbines overall lifetime) or damage.

Consideration of the impact of individual turbine manufacturing tolerances on the turbine performance and using them in a turbine model for each individual turbine allows for maximizing of an AEP through a wind park optimization by operating the turbines in an optimized manner, even in case of a component malfunction, based on its individual turbine performance.

Comparing measured lifetime data in the form of historical data AD which are received from the processing unit in addition to the manufacturing data allows for a flexible exploitation of generous manufacturing margins to maximize AEP. In addition, the processing unit PU is able to incorporate health monitoring features through a comparison of measured parameters, such as component temperatures against those which may be predicted by the turbine model TM.

The comparison of physical turbine data can be made with the associated turbine model TM to monitor situations where the turbine may be underperforming as well as providing possible insight into reasons of an underperforming. The comparison can flag potential issues and call for servicing as well as providing learning for future turbine development.

The turbine model can also be utilised to specify hardware changes as well as control parameter changes for turbines. These hardware changes can either be implemented in a revision of the turbine (including updating of the turbine parameters stored in the database) prior or during turbine serial production or retrospectively during turbine servicing.

Embodiments of the invention encompass the use of a turbine specific model in order to model certain scenarios, in particular within the turbine drive train, to extract power even from a partially operating turbine. The turbine model introduces a level of model fidelity that allows these different scenarios to be modelled. For example, the turbine model consists of a thermal model which accounts for the number of fans operating within the generator cooling system. Within the turbine model, the fans can be selectively switched off, mimicking any issues with fans in reality. This will increase wind park availability and allow strict availability minimum limits to be met.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented determination of control parameters of a turbine in case of a component malfunction, the turbine being a wind turbine having a generator or a gas turbine having a generator, comprising the steps of:
   S1) receiving, by an interface, an information indicating a component malfunction;
   S2) identifying, by a processing unit, as to what power level the turbine is operated at, by a simulation of the operation of the turbine, the simulation being made with a given turbine model in which the identified component is set to be operated with a reduced function and in which one or more characteristic values of the turbine are used as input parameter; and
   S3) deriving, by the processing unit, the control parameters for the turbine from the identified power level;
   wherein the one or more characteristic values are manufacturing tolerances of the characteristic values obtained by measurement during a manufacturing process.

2. The method according to claim 1, wherein the turbine model is a physical model which is based on a number of equations found by simulations and/or validated test data and/or lookup-tables.

3. The method according to claim 1, wherein the one or more characteristic values are retrieved from a database.

4. The method according to claim 1, wherein the one or more characteristic values are nominal parameters of the characteristic values.

5. The method according to claim 1, wherein the one or more characteristic values include one or more of:
   airgap;
   magnet performance;
   magnet dimension;
   thermal conductivity;
   coil resistance.

6. The method according to claim 1, wherein identifying the power level corresponds to determining a power versus wind speed map which is calculated from the given turbine model.

7. The method according to claim 6, wherein as further input parameters of the turbine model historical turbine sensor data and/or operating conditions are processed for determining, by the processing unit, the power versus wind speed map.

8. The method according to claim 1, wherein the turbine model considers a drive train consisting of a rotor hub, a generator or motor and a converter, of the turbine.

9. The method according to claim 1, wherein the turbine model considers blades and/or gearbox and/or nacelle and/or tower and/or cable and/or a transformer of the wind turbine.

10. The method according to claim 1, wherein for identifying as to what power level the turbine is operated a thermal performance of the turbine is modelled by the given turbine model.

11. A computer program product, comprising a computer readable hardware storage device having computer readable program code stored therein, said program code executable by a processor of a computer system to implement the method of claim 1.

12. A system for computer-implemented determination of improved control parameters of a turbine, the turbine being a wind turbine of a wind park having a generator or a gas turbine having a generator, comprising:
   an interface adapted to:
      receive an information indicating a component malfunction; and
   a processing unit adapted to:
      determine, as to what power level the turbine is operated at, by a simulation of the operation of the turbine, the simulation being made with a given turbine model in which the identified component is set to be operated with a reduced function and in which one or more characteristic values of the turbine are used as input parameter, the one or more characteristic values being manufacturing tolerances of the characteristic values obtained by measurement during a manufacturing process; and
   derive the control parameters for the turbine from the identified power level.

13. The system according to claim 12, wherein the interface and the processing unit are components of a computer system of the turbine.

14. The system according to claim 12, wherein the interface and the processing unit are components of an external computer system.

\* \* \* \* \*